United States Patent [19]

Yoshida et al.

[11] Patent Number: 5,666,347
[45] Date of Patent: Sep. 9, 1997

[54] OPTICAL DISK AND DISK CHUCKING MECHANISM

[75] Inventors: Tadao Yoshida; Katsuaki Tsurushima, both of Kanagawa, Japan

[73] Assignee: Sony Corporation, Tokyo, Japan

[21] Appl. No.: 343,362

[22] Filed: Nov. 22, 1994

Related U.S. Application Data

[63] Continuation of Ser. No. 163,592, Dec. 7, 1993, which is a continuation of Ser. No. 809,764, Dec. 18, 1991, abandoned.

[30] Foreign Application Priority Data

Dec. 28, 1990 [JP] Japan ..................... 2-416338
Dec. 28, 1990 [JP] Japan ..................... 2-416339

[51] Int. Cl.$^6$ ............................... G11B 3/70; G11B 23/00
[52] U.S. Cl. ........................................... 369/282; 369/270
[58] Field of Search ........................ 369/290, 282, 369/270, 291, 271; 360/133, 131

[56] References Cited

U.S. PATENT DOCUMENTS

| | | | |
|---|---|---|---|
| 4,351,047 | 9/1982 | Redlich et al. | 369/270 |
| 4,510,592 | 4/1985 | Kanamaru et al. | 369/270 |
| 4,539,671 | 9/1985 | Higashihara | 369/270 |
| 4,587,647 | 5/1986 | Mak et al. | 369/270 |
| 4,694,370 | 9/1987 | Ommori et al. | 369/282 |
| 4,951,277 | 8/1990 | Masunaga et al. | 369/290 |
| 5,034,933 | 7/1991 | Fujisawa et al. | 369/13 |
| 5,050,158 | 9/1991 | Kitada et al. | 369/290 |

FOREIGN PATENT DOCUMENTS

| | | |
|---|---|---|
| 0 026 475 A1 | 4/1981 | European Pat. Off. . |
| 0 192 188 A3 | 8/1986 | European Pat. Off. . |
| 0 277 809 A1 | 8/1988 | European Pat. Off. . |
| 35 39 645 A1 | 5/1986 | Germany . |
| 37 34 685 A1 | 4/1988 | Germany . |
| 59-217246 | 12/1984 | Japan ..................... 369/282 |
| 63-129578 | 6/1988 | Japan ..................... 369/290 |

OTHER PUBLICATIONS

IBM Technical Disclosure Bulletin, vol. 26, NO. 3A, Aug. 1983, New York, USA, p. 1243, F. S. Luecke: 'Disk–centering hub.'
Patent Abstracts of Japan, vol. 13, No. 322 (P–902), 20 Jul. 1989 & JP–A–10 88 951 (Matsushita), 3 Apr. 1989.
Patent Abstracts of Japan, vol. 9, No. 33 (P–334), 13 Feb. 1985 & JP–A–59 175 079 (Matsushita), 3 Oct. 1984.

*Primary Examiner*—Stuart S. Levy
*Assistant Examiner*—David D. Davis
*Attorney, Agent, or Firm*—Limbach & Limbach, L.L.P.

[57] ABSTRACT

A plate made of a magnetic material is secured to an optical disk so that it closes a central hole formed in a disk substrate. An optical disk chucking mechanism for chucking the optical disk to a disk table attracts the magnetic plate by the magnet to cause a platen to abut to the disk substrate and a tapered portion to abut to the inner side of the central hole so that the optical disk is restricted in position and is held. The optical disk and optical disk chucking mechanism restrict the loading position of the optical disk on the disk table independently of the mounting position of the magnetic plate on the disk substrate.

7 Claims, 3 Drawing Sheets

OPTICAL DISK AND DISK CHUCKING MECHANISM

This is a continuation of application Ser. No. 08/163,592 filed on Dec. 7, 1993, which was a file wrapper continuation of application Ser. No. 07/809,764 filed on Dec. 18, 1991, now abandoned.

BACKGROUND OF THE INVENTION (a) Field of the Invention

The present invention relates to an optical disk and a disk chucking mechanism for holding a disk such as optical disk in a disk recording and/or reproducing apparatus.

(b) Description of the Prior Art

The optical disk heretofore has been proposed as a recording medium for information signal.

The optical disk comprises a disc-shaped disk substrate 101 made of a transparent resin such as polycarbonate and glass and a signal recording layer 102 provided on one main side of the disk substrate 101.

The signal recording layer 102 is formed of a thin film of a metal having a relatively high reflection factor such as aluminium if the disk is a read-only optical disk. The signal recording layer 102 is formed of a thin film of a magnetic material such as perpendicularly magnetically recordable medium if the disk is an optical disk such as magneto-optical disk which information signals can be written to and read from. The surface of the signal recording layer 102 is a signal recording surface 102a. A pregroove is spirally formed in a concentric manner on the signal recording surface 102. If the disk is a read-only optical disk, phase pits are formed along a spiral or concentrical lines on the signal recording surface 102a. An optical disk recording and/or reproducing apparatus is used for writing and/or reading informational signals to and from the optical disk. The optical disk recording and/or reproducing apparatus comprises a rotary drive mechanism for supporting the optical disk to rotate it and an optical pick-up device for irradiating with a flux of light, such as laser beam, the optical disk which is rotated by the rotary drive mechanism.

In the optical disk recording and/or reproducing apparatus, a flux of light from a light source is converged and impinged upon the signal recording surface 102a by the optical pick-up device to perform read/write of informational signals. Irradiation of the optical disk with the flux of light is performed from the other main side of the disk substrate 101. In other words, the light flux from the optical pick-up device transmits through the disk substrate 101 to impinge upon the signal recording surface 102a so that the pregroove is tracked by the optical disc by the optical pick-up device.

The rotary drive mechanism of the disk recording an/or reproducing apparatus has a disk chucking mechanism to hold the optical disk. A disk chucking mechanism including a magnet for attracting disk hub made of a magnetic material, such as iron, nickel or nickel which is secured to an optical disk in the center thereof to hold the optical disk has been proposed to make the apparatus more compact in size.

The disk chucking mechanism comprises a rotary shaft 104a of a spindle motor 104 forming the rotary driving mechanism and a disk table 105 secured to the rotary shaft 104a. The disk table 105 is substantially disc-shaped and is formed in the center thereof with a supporting hole 109 into which the rotary shaft 104a is fitted. That is, the disk table 105 is secured to the rotary shaft 4a by forcedly inserting the rotary shaft 104a into the supporting hole 109.

A flat annular platen 106 is formed on the upper peripheral edge of the disk table 105. The platen 106 abuts upon the disk substrate 101 of the optical disk to restrict the height position of the optical disk, that is, the position of the disk substrate 101 in a direction perpendicular to the main surface thereof. The disk table 105 is provided with a projecting spindle shaft 107 on the upper side thereof. The spindle shaft 107 projects upward beyond the platen 106. An annular magnet 108 is provided inside of the platen 106, that is, around the spindle shaft 107. The upper side of the magnet 108 is not projected upwardly beyond the platen 106.

A disk hub 103 is secured to the disk substrate 101 of the optical disk in the center thereof. The disk hub 103 is formed of a magnetic material and is disc-shaped. The disk hub is fitted into a hub mounting hole 101 bored in the center of the disk substrate 101 and is firmly secured to the disk substrate 101 by bonding means such as adhesive. The disk hub 103 is bored with a center hole 110 in the center thereof into which the spindle shaft 107 is inserted.

In order to hold the thus formed optical disk by the disk chucking mechanism, the spindle shaft 107 is inserted into the center hole 110 of the optical disk and the disk hub 1 is placed upon the disk table 5. Then, the magnet 108 attracts the plate 103 so that the peripheral edge of the disk hub 103 is brought into a pressure contact with the plate 106. The optical disk which is held by the disk chucking mechanism in such a manner is restricted in height position relative to the platen 106 and is restricted in position in a horizontal direction, that is, in a radial direction of the disk substrate 101 relative to the spindle shaft 107 so that the optical disk is not offset from the rotary shaft 104a.

If the center of rotation of the rotary shaft 104a of the motor 104 is offset from the center of curvature of the pregroove formed on the signal recording surface 102a of the optical disk, the pregroove of the optical disk would be cyclically moved in a radial direction of the optical disk when the optical disk held by the disk chucking mechanism is rotated. If the movement of such pregroove is large, it will become difficult to irradiate the pregroove with the flux of light by the optical pick-up device, resulting in difficulty to perform a good writing and/or reading of the informational signal.

The position of the optical disk in a horizontal direction is restricted by the fitting of the spindle shaft 107 into the center hole 110 in the above-mentioned optical disk and the disk chucking mechanism. Accordingly, it is necessary to align the center of the center hole 110 with the center of curvature of the pregroove of the optical disk when the disk hub 103 is mounted upon the disk substrate 101.

Accordingly, it is necessary to mount the disk hub 103 on the disk substrate 101 after positioning the disk hub 103 relative to the pregroove formed on the disk in order to manufacture the optical disk. The manufacturing process is complicated.

In order to positively hold the disk in such a manner that the platen 106 and disk substrate 101 are not slid with each other when the disk is rotated, the magnetic force of the magnet 108 should be sufficiently strong in the above mentioned chucking mechanism.

If the magnet 108 has a sufficient magnetic force, it would become larger in size and the disk table would also become larger in size. It will become difficult to miniaturize the structure of the disk player apparatus.

If the magnetic force of the magnet 108 is made excessively strong, the magnetic flux emitted form the magnet 108 may be leaked to the signal recording surface 102a of the disk. If the magnetic flux from the magnet 108 is leaked to the signal recording surface 102a of the disk, the signal recording layer 102 of the disk is influenced by the magnetic flux leaked from the magnet 108, resulting in that good writing and/or reading of informational signals becomes impossible.

SUMMARY OF THE INVENTION

It is a first object of the present invention to provide an optical disk which can be easily manufactured and the position of which can be restricted in a good manner by using a disk table which can hold the disk in a good manner.

It is a second object of the present invention to provide a disk table which can hold a disk without enlarging the disk writing and/or reproducing apparatus in size and leaking the magnetic flux to the signal recording surface of the disk.

In order to overcome the above mentioned problems and to accomplish the above mentioned objects, the disk of the present invention includes a disc-shaped disk substrate having a recording layer and a central hole bored in the center of the disk substrate. The central hole is in the center of a curvature of a pregroove formed on the recording layer. The disk further includes a plate-like magnetic member secured to one side of the disk substrate so that the magnetic member closes the central hole.

A disk table of the present invention includes an inner ring which is connected to the spindle, a magnetic ring connected to the inner ring, and an outer ring connected to the magnetic ring. The outer ring has a tapered portion and a disk platten. The diameter of the outer ring increases at the tapered portion and the disk platen has a flat surface.

In operation, when the table is inserted into the central opening of the disk, the tapered portion contacts an inner side of the central opening, thereby positioning the center of rotation of the central opening to be substantially coincident with the center of rotation of the spindle.

Further, the flat surface of the disk platen contacts the flat surface of the disk, thereby setting the height position of the disk. In addition, the magnetic ring attracts the disk, thereby allowing the rotation of the spindle to be transferred to the disk.

In another embodiment of the present invention, the disk table includes an inner ring connected to the spindle, a magnetic ring connected to the inner ring, an outer ring connected to the inner ring, and a tapered member flexibly connected to the outer ring. The outer ring has a disk platen which has a flat surface.

In operation, when the table is inserted into the central opening of the disk, the tapered portion contacts an inner side of the central opening, thereby positioning the center of rotation of the central opening to be substantially coincident with the center of rotation of the spindle.

Further, the flat surface of the disk platen contacts the flat surface of the disk, thereby setting the height position of the disk. In addition, the magnetic ring attracts the disk and forms a closed magnetic path through the inner ring and the magnetic member, thereby allowing the rotation of the spindle to be transferred to the disk without the formation of stray magnetic flux lines.

In the optical disk of the present invention and the disk table, the plate secured to one main side of the disk substrate is attracted by the magnet of the disk table to bring the other main side of the disk substrate into an abutment to the platen of the disk table so that the optical disk is restricted in height position. The tapered portion of the disk table is brought into an abutment on the inner peripheral edge on the other side of the disk substrate 1 around the central hole bored in the center of the disk substrate so that the optical disk is restricted in a radial position. Accordingly, the optical disk is restricted in position relative to the disk substrate irrespective of the position in which the plate is secured to the disk position.

In the disk table of the present invention, the magnet for attracting the plate secured to one main side of the disk substrate forms a closed magnetic path passing through the plate and a tapered member extending from the vicinity of the magnet to the vicinity of the plate. Accordingly, the magnet will not leak the magnetic flux outside of the closed magnetic path and the magnetic force of the magnet effectively acts an attractive force to the plate.

DETAILED DESCRIPTION OF THE PREFERRED EMBODIMENTS

Now, the preferred embodiments of the present invention will be described with reference to the drawings.

Figure 1:
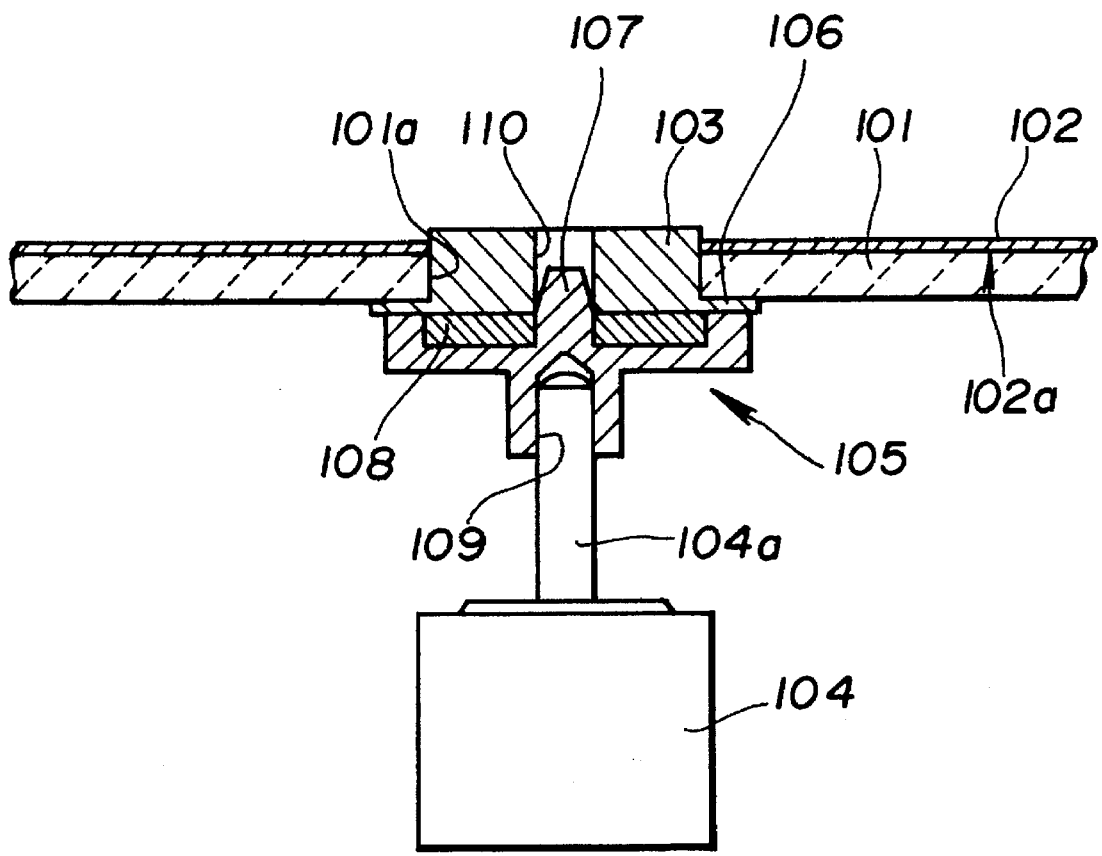
FIG. 1 is a longitudinal sectional view showing the structure of a prior art optical disk and an optical disk chucking mechanism.
Figure 2:
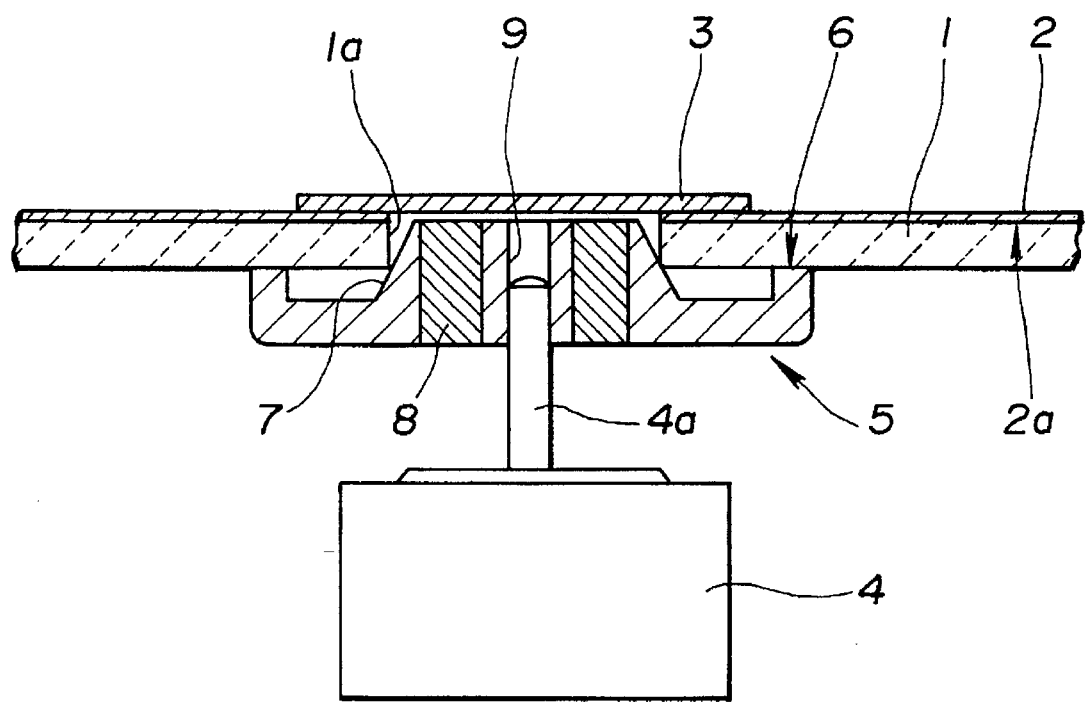
FIG. 2 is a longitudinal sectional view showing an optical disk of the present invention and an optical disk chucking mechanism of the first embodiment of the present invention.

An optical disk of the present invention comprises a disc-shaped disk substrate 1 formed of a transparent resin such as polycarbonate or glass as shown in FIG. 2. The disk substrate 1 is provided with a signal recording layer 2 on one main side thereof.

The signal recording layer 2 includes a thin layer formed of a magnetic material such as perpendicularly magnetically recordable material so that informational signal can be written thereon and read therefrom. The signal recording layer 2 has a signal recording surface 2a which is formed with a spiral pregroove (not shown). The signal recording layer 2 is formed of a metal thin film such as aluminium having a relatively high reflection factor if the disk is a read-only optical disk.

The disk substrate 1 of the optical disk is bored with a central hole 1a in the center thereof. The central hole 1a is formed so that it passes through the substrate 1 from one main side to the other main side and has a given diameter. The central hole 1a is formed simultaneously with the formation of the disk substrate 1 by means such as injection molding method. The central hole 1a is formed so that it has a central hole 1a aligned with the central of the curvature of the pregroove. In order to align the center of the central hole 1a with the center of the curvature of the pregroove in such manner, the pregroove may be formed simultaneously with the formation of the substrate 1. The precision of the alignment of the center of the central hole 1a with the center of the curvature of the pregroove depends upon the precision of a mold for molding the disk substrate 1 if the disk substrate 1 is formed by the injection molding. The pregroove may be formed in relation to the central hole 1a.

A Plate 3 is secured to one main side of the disk substrate 1 to close the central hole 1a. The plate 3 is formed of a magnetic material such as iron, stainless steel, or nickel and in the form of a disc having a diameter slightly larger than that of the central hole 1a. The plate 3 is secured to the disk substrate 1 by means such as bonding using an adhesive or pressure-sensitive adhesive.

The signal recording layer 2 may be interposed between the plate 3 and the disk substrate 1. Alternatively, the plate 3 may be in a direct contact with the disk substrate 1 without forming the signal recording layer 2 where the plate 3 and the disk substrate 1 are contacted with each other.

A disk chucking mechanism of a first embodiment of the present invention is applied to the optical disk recording and/or reproducing apparatus in which information signals are written to and read from the optical disk. The optical disk recording and/or reproducing apparatus comprises a rotary driving mechanism for holding the optical disk to rotate the disk and an optical pick-up device for impinging a light flux such as laser beam upon the optical disk which is rotated by the rotary driving mechanism.

In the optical disk recording and/or reproducing apparatus, a light flux from the light source is converged and impinged upon the signal recording surface 2a by the optical pick-up device to perform read/write of informational signals. Irradiation of the optical disk with the flux of light is performed from the other main side of the disk substrate 1. In other words, the light flux from the optical pick-up device transmits through the disk substrate 1 to impinge upon the signal recording surface 2a so that the pregroove is tracked by the optical disk by the optical pick-up device.

The disk chucking mechanism is used for supporting the optical disk by the rotary driving mechanism. The disk chucking mechanism comprises a rotary shaft 4a of a spindle motor 4 forming the rotary driving mechanism and a disk table 5 secured to the rotary shaft 4a. The disk table 5 is substantially disc-shaped and is formed in the center thereof with a supporting hole 9 into which the rotary shaft 4a is fitted. That is, the disk table 5 is secured to the rotary shaft 4a by forcedly inserting the rotary shaft 4a into the supporting hole 9.

A flat annular platen 6 is formed on the upper peripheral edge of the disk table 5. The platen 6 abuts upon the disk substrate 1 of the optical disk to restrict the height position of the optical disk, that is, the position of the disk substrate 1 in a direction perpendicular to the main surface thereof. The disk table 5 is provided with a projecting tapered portion 7 on the upper side thereof inside of the platen 6. The tapered portion 7 projects upward beyond the platen 6 and is gradually reduced in diameter from the lower base end to the upper top end thereof so that it is substantially truncated conical shaped. An annular magnet 8 is provided inside of the tapered portion, that is, around the support hole 9. The upper side of the magnet 8 is flushed with the upper end of the tapered portion 7.

In order to hold the thus formed optical disk by the disk chucking mechanism, the disk substrate 1 is placed upon the disk table 5 so that the tapered portion 7, is inserted into the central hole 1a. Then, the magnet 8 attracts the plate 3 so that the other main side of the disk substrate 1 around the central hole 1a is brought into a pressure contact with the platen 6. The upper top ends of the tapered portion 7 and the magnet 8 face with each other so that they are slightly spaced from the plate 3.

The optical disk which is held by the disk chucking mechanism in such a manner is restricted in height position by the fact that the platen 6 abuts on the disk substrate and is restricted in radial position by the fact that the tapered portion abuts on the inner peripheral end of the other main side of the substrate around the central hole 1a. Accordingly, the optical disk is restricted in position relative to the disk substrate 1 independently of the mounting position of the plate 3 relative to the disk substrate 6.

The optical disk which is held by the disk chucking mechanism is rotated together with the disk table 5 by the rotation of the motor 4. In the optical disk recording and/or reproducing apparatus, informational signals are written to and/or read from the optical disk by optical pick-up device.

Figure 3:
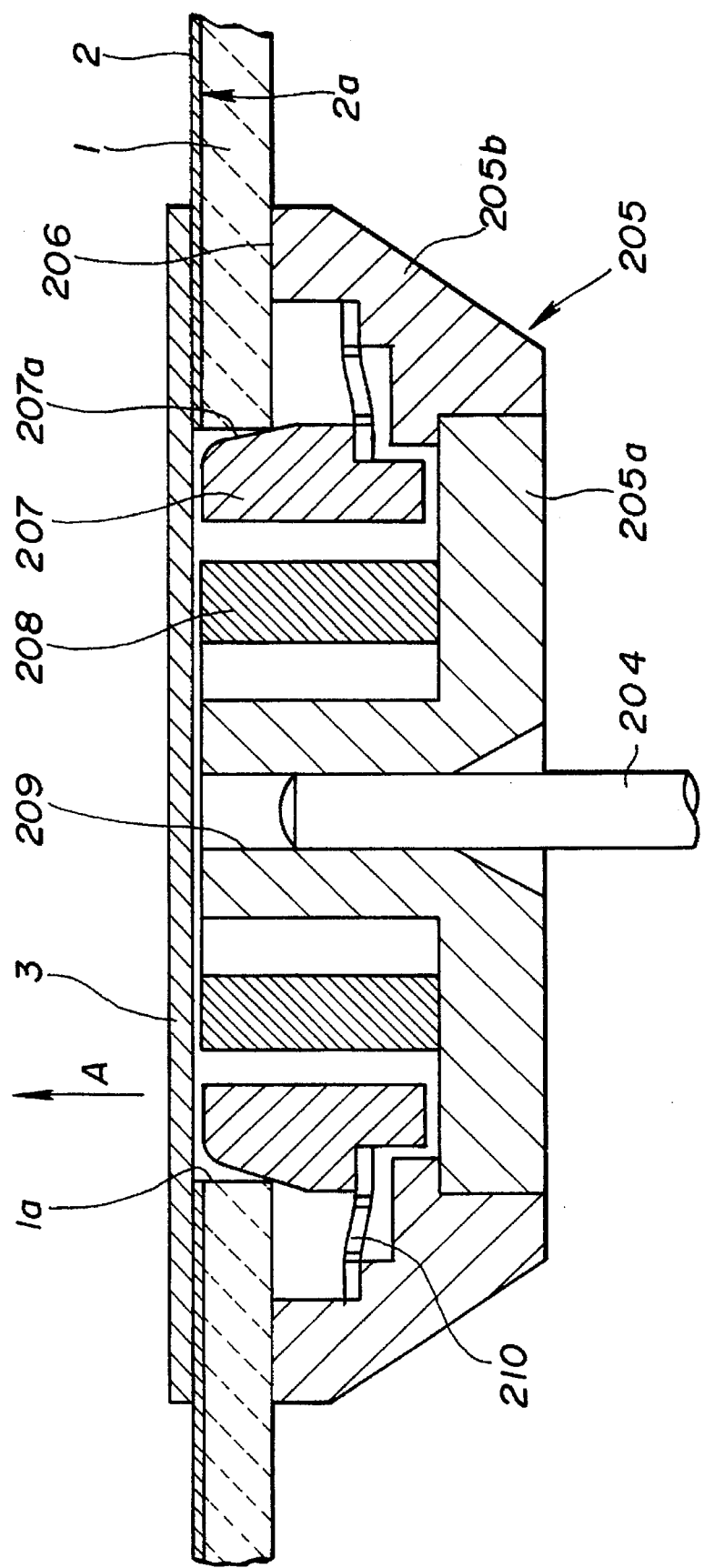
FIG. 3 is a longitudinal sectional view showing the structure of a disc chucking mechanism of the second embodiment of the present invention.

Now, a second embodiment of a disk chucking mechanism of the present invention will be described with reference to FIG. 3. In the second embodiment of the disk recording and/or reproducing apparatus of the present invention, a flux of light from a light source is converged and directed to the signal recording surface 2a by the optical pick-up device to perform writing and/or reading of informational signals to and/or from the signal recording layer 2 of the disk. Irradiation of the light flux from the optical pick-up device is performed in the other main side of the disk substrate 1. In other words, the largest flux transmits through the disk substrate 1 and impinges upon the signal recording surface 2a to track the pregroove by the optical pick-up device.

The disk chucking mechanism is used for supporting the disk in the rotary driving mechanism. The disk chucking mechanism comprises a rotary shaft 204 of a spindle motor (not shown) which constitutes the rotary drive driving mechanism and a disk table 205 secured to the rotary shaft 204 as shown in FIG. 3. The disk table 205 comprises an inner disk 205a constituting a yoke member, which is formed of a high permeability material and is substantially disk shaped and an outer annular portion 205b secured to the inner disk 205a, which is in substantially annular.

The inner disc 205a is provided in the center thereof with a support hole 209 into which the rotary shaft 204 is inserted. That is, the rotary shaft 204 is forcedly inserted into the support hole 209 from the lower side of the disk 205a so that the inner disk 205a is secured to the rotary shaft 204. The inner disk 205a has a projecting portion which upwardly project's around the central hole 209.

A flat annular platen 206 is formed on the upper side of the peripheral edge of the outer annular portion 205b. The platen 206 abuts on the disk substrate 1 of the disk to restrict the height position of the disk, that is, the position of the disk substrate in a direction perpendicular to the main side of the substrate 1.

A tapered member 207 is disposed on the upper side of the disk table 205 and inside of the outer annular portion 205b. The tapered member 207 is made of a material such as a synthetic resin and is annular in shape and has a tapered portion 207a on the outer, upper and peripheral edge thereof. The tapered portion 207a is gradually enlarged in diameter form one end to the other end to constitute a part of the outer periphery of a substantially conical member. The tapered member 207 is supported on the outer annular portion 205b via a ring shaped leaf spring 210 disposed between the outer periphery of the tapered member 207 and the inner side of the outer annular portion 205b of the disk table 205 so that one end of the tapered member 207 projects beyond the platen 206. The ring shaped leaf spring 210 is formed with a plurality of displacement arms which extend between the outer periphery of the tapered member 207 and the inner side of the outer annular portion 205b. The displacement arms are formed in such a manner that they are radially disposed. The tapered member 207 is elastically movable in a direction perpendicularly to the platen 206, that is, in an axial direction of the rotary shaft 204 by the elastic displacement of the displacement arms of the ring shaped leaf spring 210.

A magnet 208 which is cylindrical in shape is provided within the tapered member 207 so that the magnet 208 is coaxial with the inner disk 205a. The magnet 208 has an end which constitutes one pole and faces in the same direction as the platen 206, that is, toward a disk which is restricted in position by the platen 206 and has the other end constituting the other pole, which is supported on the inner disc 205a. One end of the magnet 208 is substantially flush with one end of the projecting portion of the inner disc 205a around the central hole 209.

In order to hold the thus formed optical disk by the disk chucking mechanism of the second embodiment of the present invention, the disk substrate 1 is placed upon the platen 206 of the disk table 5 so that the tapered portion 207 of the tapered member 207 is inserted into the central hole 1a. Then, the magnet 208 attracts the plate 3 so that the other main side of the disk substrate 1 around the central hole 1a is brought into a pressure contact with the plate 206. The disk substrate 1 is restricted in height position relative to the platen 6.

At this time, the tapered member 207 is brought into an abutment on the inner peripheral edge of the central hole 1a so that it is moved toward the base end of the rotary shaft. The tapered member 207 is elastically biased by the elastic force of the ring shaped leaf spring 210 so that it is returned to an initial position in a direction of an arrow A in FIG. 3 and the tapered portion 207a is brought into pressure contact with the inner peripheral edge of the central hole 1a on the other main side thereof. Centering operation of the disk is conducted by pressure contacting the tapered portion 207a with the inner peripheral edge of the central hole 1a on the other side of the disk by the ring shaped leaf spring 210. Accordingly, the disk substrate 1 is moved in a radial direction so that the center of the tapered member 207 is aligned with the center of the rotary shaft 200.

At this time, the peripheral portion of the inner disk 205a around the support hole 209 and one end of the magnet 208 face to the plate 3 so that they are slightly spaced from the plate 3. The magnet 208 forms a closed magnetic path which passes through the inner disc 205a and the plate 3 from the magnet 208. That is, a magnetic flux emitted from the magnet 208 passes through the inner disk 205a and the peripheral portion of the disk 205 around the support hole 209 in the vicinity of the plate to reach the plate 3 and returns to the magnet 208 from the plate 3. Accordingly, the magnetic flux emitted from the magnet 208 will not be leaked to the signal recording layer 2, etc. so that the magnetic flux will give no influence upon the informational signals stored in the signal recording layer 2. Since substantially all of the magnetic flux of the magnet 208 passes along the closed magnetic path, it effectively acts as an attracting force upon the plate 3.

The plate 3 is formed in thickness thicker than a given thickness, for example, about 0.3 mm so that the magnetic flux emitted from the magnet 208 can transmit through the plate 3 without being externally leaked.

The optical disk which is held by the disk chucking mechanism in such a manner is restricted in height position by the fact that the platen 206 abuts on the disk substrate and is restricted in radial position by the fact that the tapered portion 207a abuts on the inner peripheral edge of the other main side of the substrate 1 around the central hole 1a. Accordingly, the optical disk is restricted in position relative to the disk substrate 1 irrespective of the mounting position of the plate 3 relative to the disk substrate 1.

The optical disk which is held by the disk chucking mechanism is rotated together with the disk table 5 when the rotary shaft 204 is rotated by the motor. In the optical disk recording and/or reproducing apparatus, informational signals are written to and/or read from the optical disk by optical pick-up device.

As mentioned above, in the optical disk of the present invention and the disk chucking mechanism of the first embodiment, the plate secured to one main side of the disk substrate is attracted by the magnet of the optical disk chucking mechanism to bring the other main side of the disk substrate into an abutment to the platen of the optical disk chucking mechanism so that the optical disk is restricted in height position. The tapered portion of the optical disk chucking mechanism is brought into an abutment on the inner peripheral edge on the other side of the disk substrate 1 around the central hole bored in the center of the disk substrate so that the optical disk is restricted in a radial position.

That is, the optical disk is restricted in position relative to the disk substrate independently of the position in which the plate is secured to the disk position. Accordingly, it is not necessary to position and secure the plate to the disk substrate at a high precision so that the manufacturing of the optical disk is easy.

In other words, the present invention can provide an optical disk which is easy to manufacture and can be restricted in position by using an optical disk chucking apparatus and an optical disk chucking mechanism which can hold the optical disk in a good manner.

In the disk chucking mechanism of the second embodiment of the present embodiment, the magnet for attracting the plate secured to one main side of the disk substrate forms a closed magnetic path passing through the plate and a yoke member extending from the vicinity of the magnet to the vicinity of the plate.

Accordingly, the magnet will not leak the magnetic flux outside of the closed magnetic path and the magnetic force of a magnet effectively acts an attractive force to the plate. Therefore, enough attractive force to the plate can be obtained even if a small size magnet is used. The magnetic flux will not interfere with good read and write of informational signals since there is no possibility that the magnetic flux from the magnet will give an influence to the disk in the disk chucking mechanism even if a disk in which informational signals are magnetically recorded is used.

In brief, the present invention can provide a disk chucking mechanism which will not enlarge the disk apparatus and is capable of holding the disk in a good manner without leaking the magnetic flux for the signal recording surface of the disk.

What is claimed is:

1. A disk table for positioning the center of rotation of a central opening of a disk and for transferring rotation to the disk, the disk having a top surface, a bottom surface and a magnetic portion, the table comprising:

a spindle;

an inner ring connected to the spindle;

a magnetic ring connected to the inner ring, the magnetic ring attracting the magnetic portion of the disk, allowing rotation of the spindle to be transferred to the disk; and an outer ring unmovably connected to the magnetic ring, the outer ring having a tapered portion and a disk platen, the disk platen having a flat surface that contacts the bottom surface of the disk to set the height position of the disk when the disk is positioned on the disk table, the tapered portion downwardly extending into a region of the disk table, when the table is inserted into the central opening, of the disk, the tapered portion contacts an inner side of the central opening, positioning the center of rotation of the central opening to be substantially coincident with the center of rotation of the spindle.

2. The disk table as defined in claim 1 wherein the tapered portion of the disk table projects upward beyond the disk platen.

3. The disk table as defined in claim 1 wherein the tapered portion has a substantially truncated conical shape.

4. The combination of an optical disk and a disc table, comprising:

an optical disk which includes:
a substrate having a central opening,
a recording layer formed on one surface of the substrate, and
a plate permanently attached to a side of the substrate to close the central opening, and a disk table which includes:
an inner ring connected to the spindle;
a magnetic ring connected to the inner ring;
an outer ring connected to the inner ring, the outer ring having a disk platen, the disk platen having a flat surface; and
a tapered member flexibly connected to the outer ring;

when the table is inserted into the central opening of the disk, the tapered member contacts an inner side of the central opening, positioning the center of rotation of the central opening to be substantially coincident with the center of rotation of the spindle, the flat surface of the disk platen contacts the flat surface of the disk, setting the height position of the disk; and the magnetic ring attracts the disk and forms a closed magnetic path through the inner ring and the plate formed on the disk, allowing the rotation of the spindle to be transferred to the disk without the formation of stray magnetic flux lines.

5. The disk table as defined in claim 4 wherein the magnetic ring is disposed in the disk table so that one pole of the magnetic ring faces the plate and so that the other pole of said magnet contacts the inner ring, the magnet forming a closed magnetic path through the inner ring and the plate.

6. A disk table for positioning the center of rotation of a central opening of a disk and for transferring the rotation of a spindle to the disk, the disk having a magnetic member, the table comprising:

an inner portion connected to the spindle;

a magnetic portion connected to the inner portion, the magnetic portion attracting the magnetic member of the disk, allowing the rotation of the spindle to be transferred to the disk; and an outer portion unmovably connected to only the magnetic portion, the outer portion having a tapered region and a disk platen, the disk platen having a flat surface, the flat surface of the disk platen contacting the bottom surface of the disk to set the height position of the disk when the disk is positioned on the disk table the tapered portion downwardly extending into a region of the disk table, when the table is inserted into the central opening of the disk, the tapered region contacts an inner side of the central opening, positioning the center of rotation of the central opening to be substantially coincident with the center of rotation of the spindle.

7. The combination of an optical disk and a disc table, comprising:

an optical disk which includes:
a substrate having a central opening,
a recording layer formed on one surface of the substrate, and
plate permanently attached to a side of the substrate to face the recording surface and close the central opening, and a disk table which includes:
an inner portion connected to the spindle;
a magnetic portion connected to the inner portion; and
an outer portion connected to the inner portion, the outer portion having a disk platen, the disk platen having a flat surface;
a tapered member flexibly connected to the outer portion;

when the table is inserted into the central opening of the disk, the tapered member contacts an inner side of the central opening, positioning the center of rotation of the central opening to be substantially coincident with the center of rotation of the spindle, the flat surface of the disk platen contacts the flat surface of the disk, setting the height position of the disk;

the magnetic portion attracts the disk and forms a closed magnetic path through the inner portion and the plate of the disk, allowing the rotation of the spindle to be transferred to the disk without the formation of stray magnetic flux lines.

* * * * *